Figure 1:
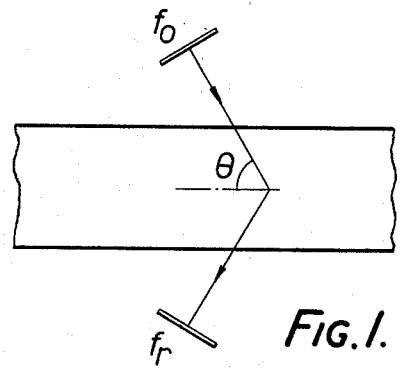

United States Patent [19]

Ashmore et al.

[11] 4,335,617
[45] Jun. 22, 1982

[54] FLOWMETER

[75] Inventors: Michael P. Ashmore, Enysham; Thien V. How, Headington; Peter Rolfe, Boars Hill, all of England

[73] Assignee: Vickers Limited, London, England

[21] Appl. No.: 124,822

[22] Filed: Feb. 26, 1980

[30] Foreign Application Priority Data

Feb. 27, 1979 [GB] United Kingdom ................ 7906900

[51] Int. Cl.³ .............................................. G01F 1/66
[52] U.S. Cl. .................................................. 73/861.25
[58] Field of Search ........... 73/861.25, 861.27, 861.28, 73/861.29, 861.12

[56] References Cited

U.S. PATENT DOCUMENTS 3,788,140  1/1974  Turtle ............................... 73/861.28
4,122,713  10/1978  Stasz et al. ........................ 73/861.25

FOREIGN PATENT DOCUMENTS 1279529  11/1961  France ............................ 73/861.12
925541  5/1963  United Kingdom ............ 73/861.25

*Primary Examiner*—Charles A. Ruehl
*Attorney, Agent, or Firm*—Larson and Taylor

[57] ABSTRACT

A flow transducer assembly (1) comprises a body (2), through which extends a passage (3) for carrying a fluid whose flow-velocity is to be measured. The body defines an inlet mouth (7) for the passage (3) which is so shaped as to provide, in use, a region in the mouth (7) in which the velocity profile across the width of the mouth (7) is substantially uniform. The transducer assembly (1) also includes transducer means (4, 5, 8, 9, 10, 11) for use in performing a direct measurement of the flow-velocity in the said region.

4 Claims, 2 Drawing Figures

FLOWMETER

This invention relates to measuring flow-velocities (and flow-rate).

Flow velocity and volume flow of a fluid flowing through a passage can be measured by various forms of measuring device, for example using the thermal loss of heated resistance sensors, or electromagnetic (for electrically conductive fluids) or Doppler ultrasound (for inhomogeneous fluids) techniques.

Due to the existence of boundary layers adjacent to the bounding walls of the passage in viscous fluid flow, the distribution of fluid velocities, or velocity profile, over the cross-section of the passage is seldom uniform. The shape of the velocity profile is a function of the viscous properties of the fluid and fluid dynamic factors.

With techniques which measure the fluid velocity at only one point in the passage, e.g. a heated film or wire probe, it is necessary to measure the point velocities over the entire cross-section of the passage in order to compute the mean flow velocity. Electromagnetic flowmeters can measure mean flow regardless of the shape of the velocity profile but for this purpose it is necessary that the profile be axisymmetric.

Another difficulty arises in the use of known Doppler effect velocimeters such as indicated in FIG. 1 of the accompanying drawing. Here a beam of ultrasonic energy is emitted from a transmitting piezoelectric crystal, driven by a high frequency oscillator, frequency $f_o$, into a fluid flow in a duct or passage at an angle $\theta$ to the axis. Scattering of the beam takes place within the sound field as a result of interaction with particles suspended in the fluid. Backscattered ultrasonic energy, of frequency $f_r$, is then picked up by a receiving piezoelectric crystal. If the fluid is in motion in the duct relative to the crystals, the received signal will be shifted in frequency from the transmitted signal by an amount given by:

$$f_d = f_r - f_o = u f_o 2 \cos\theta / c \tag{1}$$

where
  $c$ = velocity of ultrasound in the fluid, and
  $u$ = velocity of the scattering particles in the flow.

Equation 1 is only applicable in the case of a single particle moving at a steady velocity through a monochromatic ultrasonic field which extends over an infinitely wide beamwidth. For the above condition the Doppler frequency spectrum is a single spectral line, located at $f_d$.

In practical Doppler velocimeters a range of Doppler shifted frequencies is normally obtained. This is due to the large number of randomly distributed scattering particles which may not travel at the same velocity, as in the case of viscous laminar and fully developed flow in a pipe or duct. Furthermore, this broading of the Doppler spectrum will also occur as a result of the existence of a finite beam width, turbulence in the fluid and the range of angles over which the backscattered ultrasound is received by the crystal. (It is evident from FIG. 1 that as a single scattering particle moves axially through the insonated volume, a range of angles, $\theta$, with respect to the centre of the crystals is obtained. Thus, a single scattering particle can contribute to a spread of $f_d$.)

With continuous wave Doppler velocimeters, the Doppler signals (i.e. difference frequency signals) are normally processed by means of a zero-crossing detector (ZCD). In theory, the ZCD responds linearly to the 2nd moment of the Doppler spectrum (or the root mean square) rather than the mean.

Therefore, only in the instance where the Doppler spectrum consists of a single frequency or a narrow frequency band can the ZCD be used to estimate the average frequency of the Doppler spectrum (and hence the mean velocity), both for steady and unsteady flow conditions. For broadband spectra in the particular case where the shape of the spectra remains constant, e.g. in steady, laminar and fully developed flow or in other cases where the velocity profiles are known and do not change during the measurement, it is possible to derive correction factors from calibration tests. Under these conditions an accurate estimate of mean flow velocity may be obtained from a Doppler flowmeter using a ZCD. Unfortunately, under unsteady and oscillatory flow conditions, because where the piezoelectric transmitting and receiving crystals are conventionally sited there is normally a large boundary layer of varying thickness present, the shape of the Doppler frequency spectrum will change as a result of changes in the velocity profile with time. For this reason Doppler velocimeters used in conjunction with ZCD have not been successfully applied to pulsatile flow measurement.

According to the invention from one aspect there is provided a flowmeter comprising a body through which extends a passage for carrying a fluid whose flow-velocity is to be measured, the body defining an inlet mouth for the passage which is so shaped as to provide, in use, a region in the mouth in which the velocity profile across the width of the mouth is substantially uniform, the flowmeter further comprising flow measuring means arranged to perform a direct measurement of the flow velocity in the said region.

According to the invention from another aspect there is provided a transducer assembly for use in measuring fluid flow, comprising a body through which extends a passage for carrying a fluid whose flow-velocity is to be measured, the body defining an inlet mouth for the passage which is so shaped as to provide, in use, a region in the mouth in which the velocity profile across the width of the mouth is substantially uniform, the transducer assembly comprising transducer means for use in performing a direct measurement of the flow-velocity in the said region.

In this way the first difficulty mentioned above can be overcome, since the measurement taken by the flow measuring means will represent the mean flow-velocity irrespective of the position, laterally from the axis, in the flow where the measurement is actually taken, since the velocity profile is substantially flat or uniform in the said measuring region.

In one constructional arrangement the aforesaid body consists of a polymethyl methacrylate block and said source and said detector are, respectively, ultra-sonic piezoelectric transducers each bonded on a different inclined surface machined in said body, said transducers having electrical connection leads which pass through said body to respective solder tags on the outside of said body, intended for connection to a processor. Suitably, each inclined surface is inclined to the axis of said passage at an angle between 30° and 50°. Preferably, the two piezoelectric transducers are so positioned that the insonated volume within said inlet mouth, from which scattered ultrasonic energy is received, in use by the detecting piezoelectric transducer, is within the near field of the two transducers.

A flowmeter can be constructed from a transducer assembly as defined above and a processor which is arranged to produce a Doppler signal in dependence upon the emitted and detected wave energies so as to provide a measurement of the mean flow velocity. The processor suitably comprises a zero-crossing detector which is linearly responsive to the second moment of the Doppler spectrum to provide said measurement of the mean flow-velocity.

In a preferred arrangement for said body, the inlet mouth is shaped to provide a round bell-mouth entrance, of which the profile of the bounding wall is substantially part-elliptical in axial section.

Figure 2:
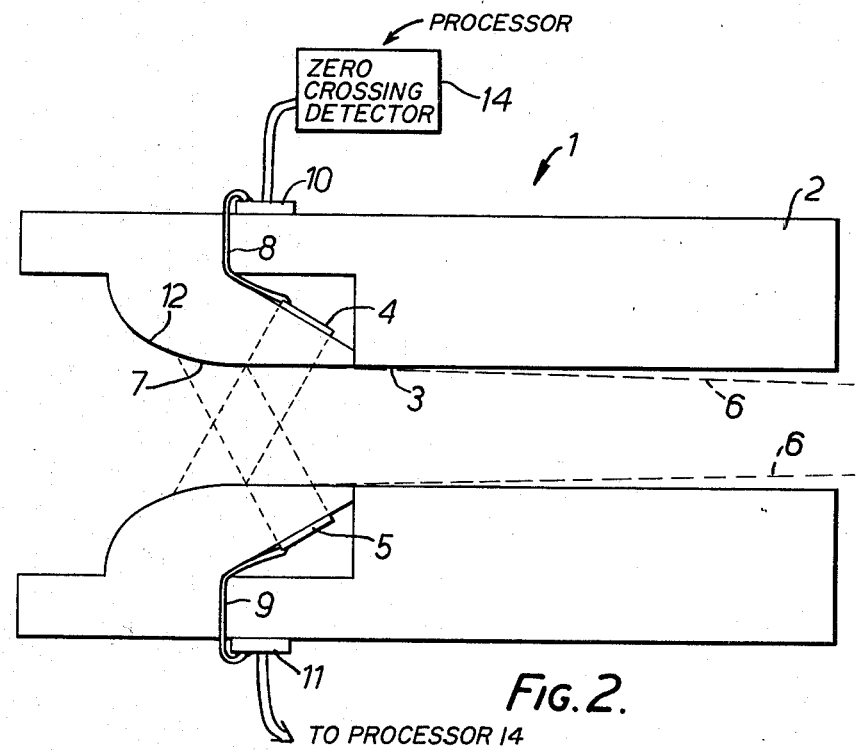

Referring to the drawings,

FIG. 1 is, as described above, a high diagrammatic representation of a conventional Doppler effect velocimeter, and FIG. 2 is a diagrammatic representation of a flow meter constructed in accordance with the present invention.

For a better understanding of the invention and to show how the same may be carried into effect, reference will now be made, by way of the example, to FIG. 2 of the accompanying drawings which illustrates, very diagrammatically, a practical embodiment of the invention.

In FIG. 2, a transducer assembly 1, forming part of a flowmeter which can measure pulsatile flow velocities accurately, comprises an elongate body 2 through which extends a passage 3 for carrying the fluid flow. The body can be made of polymethyl methacrylate and its inside surfaces carefully machined and polished. In use, the flow through the passage 3 sets up a developing boundary layer 6 in the passage which starts at a point just downstream of the mouth 7 of the passage. The mouth 7 is shaped to provide a round bell-mouth entrance to the passage. The entrance profile 12 as seen in an axial section view can be part-elliptical, as shown. The bell-mouth entrance provides a region in the mouth, upstream of the place where the boundary layer is established, in which the fluid flow or velocity profile for the width of the passage is substantially flat or uniform. This result can be enhanced if the fluid passes from a reservoir directly into the mouth 7.

Piezoelectric transmitting and receiving transducers 4, 5 respectively are mounted in the transducer assembly such that the measurement is carried out for an insonated volume in the aforesaid region of the mouth of the passage where the flow velocity profile is flat or uniform.

Each transducer 4, 5 comprises a piezoelectric crystal bonded on an inclined face machined in the polymethyl methacrylate body at preferably between 30° and 50° to the direction of flow, at a respective side of the probe so that the crystals are on opposite sides of the passage 3. Electrical connections 8, 9 for the transducers 4, 5 respectively, lead to associated solder tags 10, 11 on the outside of the body 2 for connection with a Doppler processor (14) which comprises a zero-crossing detector. The transducer assembly and Doppler processor together comprise a flowmeter.

Since even for pulsatile flow (or oscillatory viscous flow superimposed on a steady flow) with no backflow the velocity profile is *uniform* during the cycle even though the flow magnitude will change with the flow variation with time, the output readings of the zero-crossing demodulator will give an accurate indication of the instantaneous mean flow velocity under both steady and unsteady flow conditions.

The diameter D of the passage will in practice be governed by the range of flow rates to be measured and the maximum allowable pressure drop. For example, with a 4 mm passage diameter the demodulator output is linear with flow rates ranging from 20 ml/min to 1.3 l/min. The corresponding mean flow velocities for liquid flows are 2.7 cm/sec and 1.5 m/sec.

In determining the appropriate crystal size two important factors have the be considered. Firstly, in order to minimize broadening of the Doppler spectrum due to divergence of the sound field it is desirable to include the intersection of the ultrasonic beams or insonated volume within the near field of the crystals. For a rectangular crystal of length 2b and width 2b/N ($1 \leq N$), the sound field is effectively concentrated within a channel of rectangular cross-section extending from the crystal, the cross-sectional dimensions being substantially the same as those of the crystal to a distance from the crystal of $\frac{1}{4} (2b/N\lambda)^2$ where $\lambda$ is the ultrasound wavelength. Thus, for a given ultrasonic frequency the range of the near field increases with crystal size. Secondly, geometrical broadening of the Doppler spectrum due to the range of angles over which the backscattered ultrasound is received by the crystal should be minimized. This can be achieved by using crystals as narrow as possible and mounted far from the passage 3.

We claim:

1. A flowmeter, suitable for use in measuring pulsatile fluid flow, comprising a transducer assembly and a processor, said transducer assembly comprising (A) a body through which extends a passage for carrying a fluid whose flow-velocity is to be measured, the body defining an inlet mouth for the passage which is so shaped as to provide, in use, a region in the mouth in which the velocity profile across the width of the mouth is substantially uniform, (B) an ultrasonic piezoelectric source arranged to emit wave energy along a path across the axis of the said passage, (C) an ultrasonic piezo-electric detector arranged to detect wave energy received as a result of the emitted energy being scattered within the fluid flow, the source and the detector being bonded on a different inclined surface machined in said body close to said inlet mouth and being set back from the fluid flow passage so that the insonated volume within the said inlet mouth, from which scattered ultrasonic energy is received by the detector, is within the near field of both said source and said detector, and said processor comprising a zero-crossing detector for providing a direct measurement of the mean flow-velocity in the said region.

2. A flowmeter according to claim 1, wherein said body is formed with channels for receiving electrical connection leads for each of said source and detector.

3. A transducer assembly according to claim 1, wherein each said inclined surface is inclined to the axis of said passage at an angle between 30° to 50°.

4. A transducer assembly according to claim 1 or claim 3, wherein the inlet mouth is shaped to provide a round bell-mouth entrance, of which the profile of the bounding wall is substantially part-elliptical in axial section.

* * * * *